United States Patent [19]
Trott

[11] Patent Number: 5,771,323
[45] Date of Patent: Jun. 23, 1998

[54] MICRO-PHOTONICS MODULE

[75] Inventor: Gary R. Trott, San Mateo, Calif.

[73] Assignee: Hewlett-Packard Company, Palo Alto, Calif.

[21] Appl. No.: 705,867

[22] Filed: Aug. 28, 1996

[51] Int. Cl.⁶ .................................................. G02B 6/36
[52] U.S. Cl. .............................................. 385/35; 385/93
[58] Field of Search ................................. 385/65, 83, 35, 385/93, 49

[56] References Cited

U.S. PATENT DOCUMENTS

| | | | |
|---|---|---|---|
| 5,124,281 | 6/1992 | Ackerman et al. | 437/209 |
| 5,181,216 | 1/1993 | Ackerman et al. | 372/36 |
| 5,291,572 | 3/1994 | Blonder et al. | 385/94 |
| 5,307,434 | 4/1994 | Blonder et al. | 385/91 |
| 5,367,589 | 11/1994 | MacDonald et al. | 385/37 |
| 5,439,782 | 8/1995 | Haemmerle et al. | 430/321 |
| 5,481,629 | 1/1996 | Tabuchi | 385/49 |

FOREIGN PATENT DOCUMENTS

| | | | |
|---|---|---|---|
| 56-46203 | 4/1981 | Japan | 385/93 |
| 62-96912 | 5/1987 | Japan | 385/35 |

Primary Examiner—John Ngo
Attorney, Agent, or Firm—Thomas X. Li

[57] ABSTRACT

An optical submount and a method of making the optical submount are described. A cavity is formed in a substrate. The cavity has sloping side walls. A photonics device is then mounted on the substrate at a predefined distance from the cavity with the optical axis of the photonics device aligned with a diagonal of the cavity. A spherical lens is seated in contact with the side walls of the cavity to have a predefined relationship with the photonics device without light beam obstruction.

20 Claims, 18 Drawing Sheets 5,771,323

MICRO-PHOTONICS MODULE

BACKGROUND OF THE INVENTION

1. Field of the Invention

The present invention pertains to fiber optics or photonics modules. More particularly, this invention relates to an improved micro-photonics module made with a high degree of precision, without light beam obstruction, and at a minimized cost.

2. Description of the Related Art

Optical communications systems are widely used for carrying very large amount of information with low distortion and at low cost over great distances. For this reason, considerable development has been done on components of optical communication systems, such as photonics packages or modules. Photonics generally refers to devices that share both electronic and optical attributes. These devices can be laser devices, which generate coherent light in response to an electronic signal, and photo detectors, which generate an electronic signal in response to light.

Typically, photonics modules use edge emitting semiconductor lasers and surface detecting photo detectors (see FIGS. 1A and 1B). As can be seen from FIG. 1A, because an edge emitting laser 11 has a relatively wide radiation angle, a transmitter module 10 typically has a lens 12 inserted between the laser 11 and an optical fiber 13 to obtain high efficiency in optical coupling. As can be seen from FIG. 1B, a lens 17 is also inserted between the optical fiber 13 and a photo detector 15 in a receiver module 14 to obtain high coupling efficiency. This allows the coupling efficiency and the distance between different elements to very according to the design objectives.

In making the transmitter module 10, the laser 11, the lens 12, and the optical fiber 13 must be in a precise and predetermined alignment with one another. Likewise, the optical fiber 13, the lens 17, and the photo detector 15 must also be in a precise predetermined alignment with one another when making the receiver module 14. To achieve this, three-dimensional fixtures and/or mounts are typically needed to hold the components in place and in alignment with one another, as shown in FIGS. 2A and 2B.

FIG. 2A is a side cross sectional view of the package of the transmitter module 10 of FIG. 1A. FIG. 2B is a side cross sectional view of the package of the receiver module 14. As can be seen from FIG. 2A, a fixture 18a is used to hold the lens 12 in place and in predetermined alignment with the laser 11 that is also mounted on the fixture 18a. This fixture 18a is then coupled to another fixture 18b that holds the optical fiber 13 in place, thus forming the module 10. The alignment of the laser 11, the lens 12, and the optical fiber 13 is achieved by the fixtures 18a and 18b. In FIG. 2B, fixture 19a is used to hold and align the lens 17 with the photo detector 15 and a fixture 19b is used to hold the optical fiber 13. The fixture 19b is then coupled with the fixture 19a such that the optical fiber 13 is aligned with the lens 17.

One disadvantage of such photonics modules or packages is that the fixtures are costly to fabricate because they require relatively high precision. Another disadvantage is that it is time consuming to assemble components of the photonics modules into precise positions using the fixtures, thus causing low throughput. In addition, considerable time and care may also be needed for alignment and adjustment during assembling the photonics modules. This prevents mass-production of the photonics modules by operators having a moderate level of skill while maintaining the required alignment criteria. These factors typically limit the cost reduction of the photonics modules.

SUMMARY OF THE INVENTION

The present invention allows a micro-photonics module to be made with a high degree of precision.

The present invention allows a micro-photonics module to have a robust mechanical property.

The present invention allows a micro-photonics module to be made at a minimized cost.

The present invention also provides an improved micro-photonics module without light beam obstruction between a photonics device (e.g., laser or photo detector) and a lens.

Below described is a method of making an optical device. The method includes the step of forming a cavity with sloping side walls in a substrate. A photonics device is mounted on the substrate at a predefined distance from the cavity with the optical axis of the photonics device aligned with a diagonal of the cavity. A spherical lens is seated in contact with the side walls of the cavity to have a predefined relationship with the photonics device without light beam obstruction.

Also described is an optical device that includes a substrate and a cavity formed in the substrate. The cavity has sloping side walls. A photonics device is mounted on the substrate at a predefined distance from the cavity with its optical axis aligned with a diagonal of the cavity. A spherical lens is confined in contact with the side walls of the cavity in a predefined relationship with the photonics device without light beam obstruction.

Other features and advantages of the present invention will become apparent from the following detailed description, taken in conjunction with the accompanying drawings, illustrating by way of example the principles of the invention.

DETAILED DESCRIPTION OF THE INVENTION

Figure 1A:
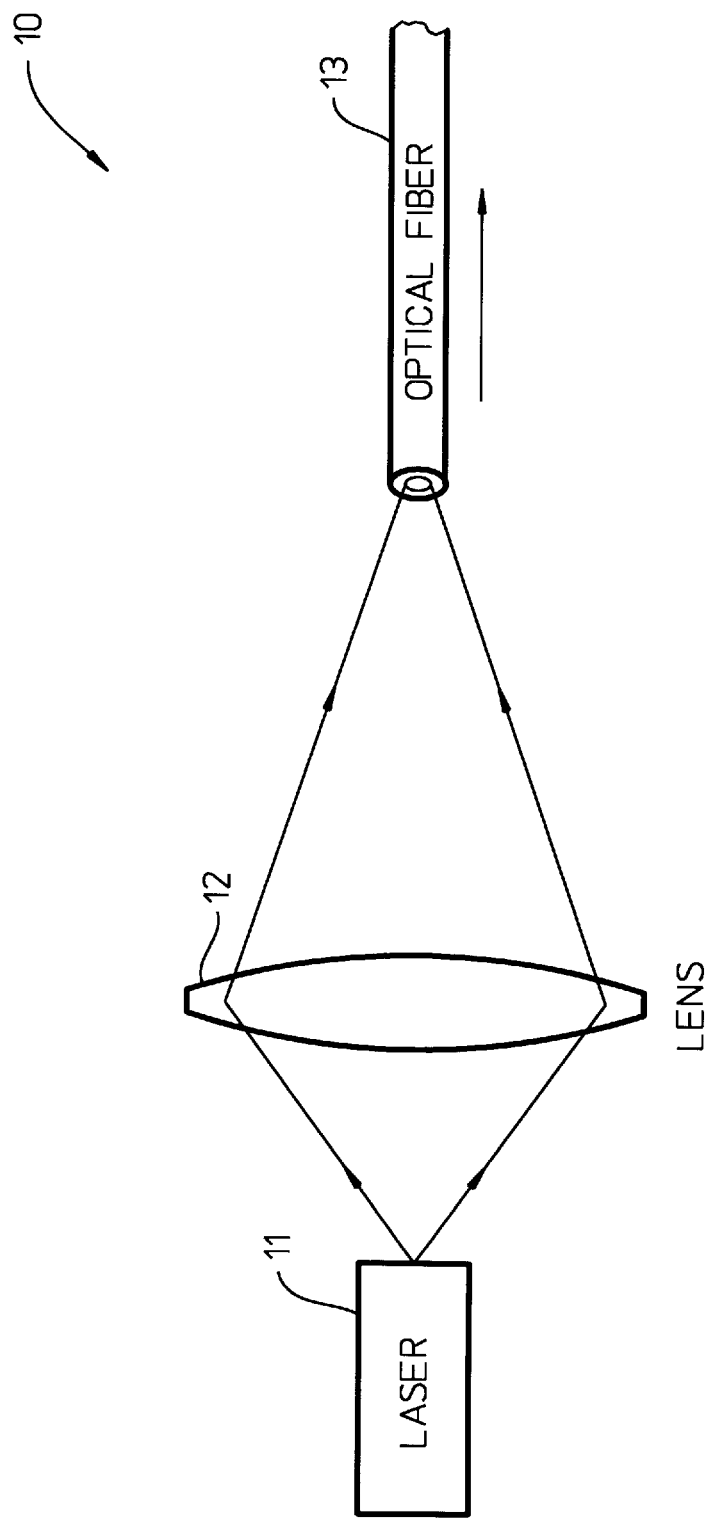
FIG. 1A and 1B are schematic illustrations of prior art photonics modules.
Figure 1B:
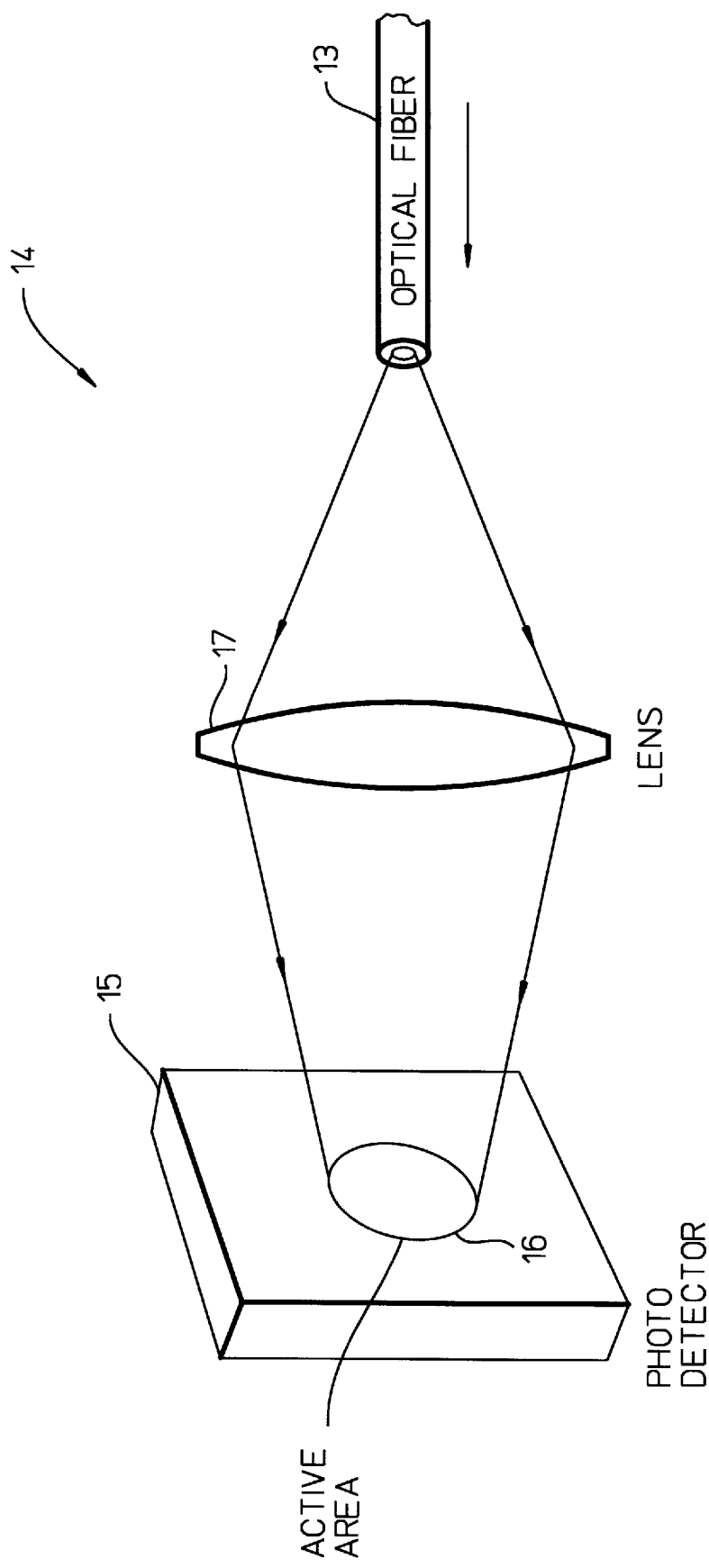
Figure 2A:
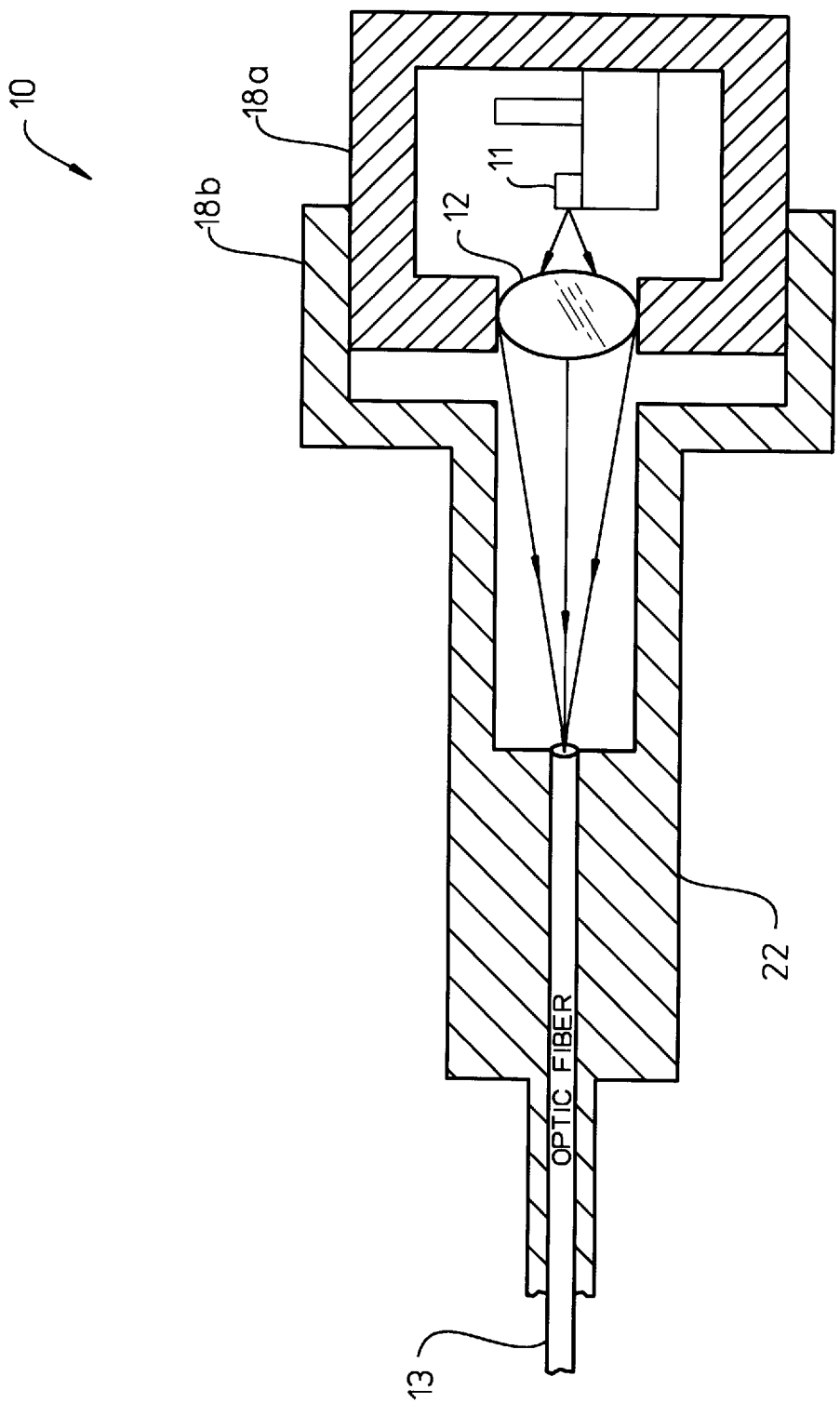
FIG. 2A is a cross sectional view showing the package of the photonics module of FIG. 1A.
Figure 2B:
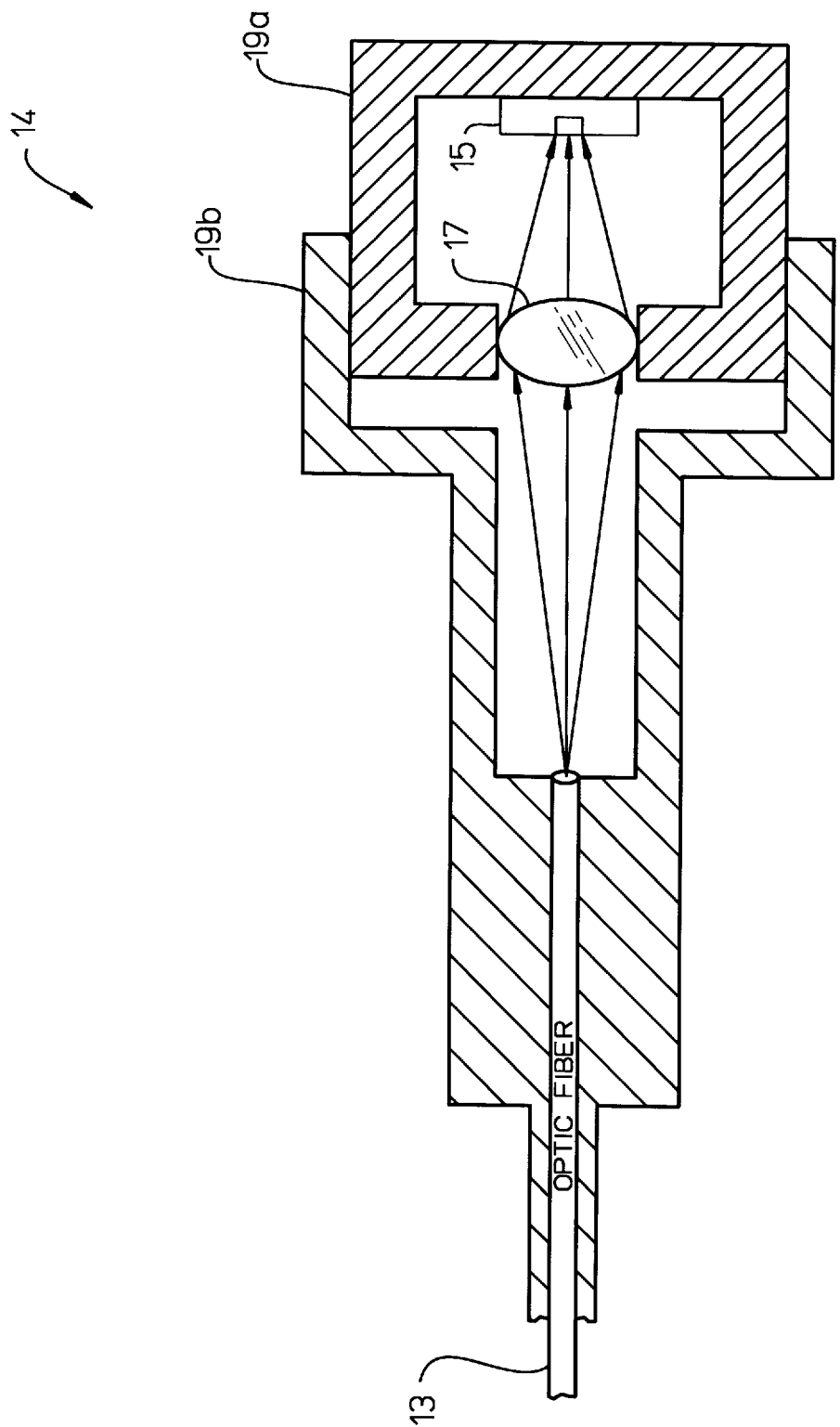
FIG. 2B is a cross sectional view showing the package of the photonics module of FIG. 1B.
Figure 3:
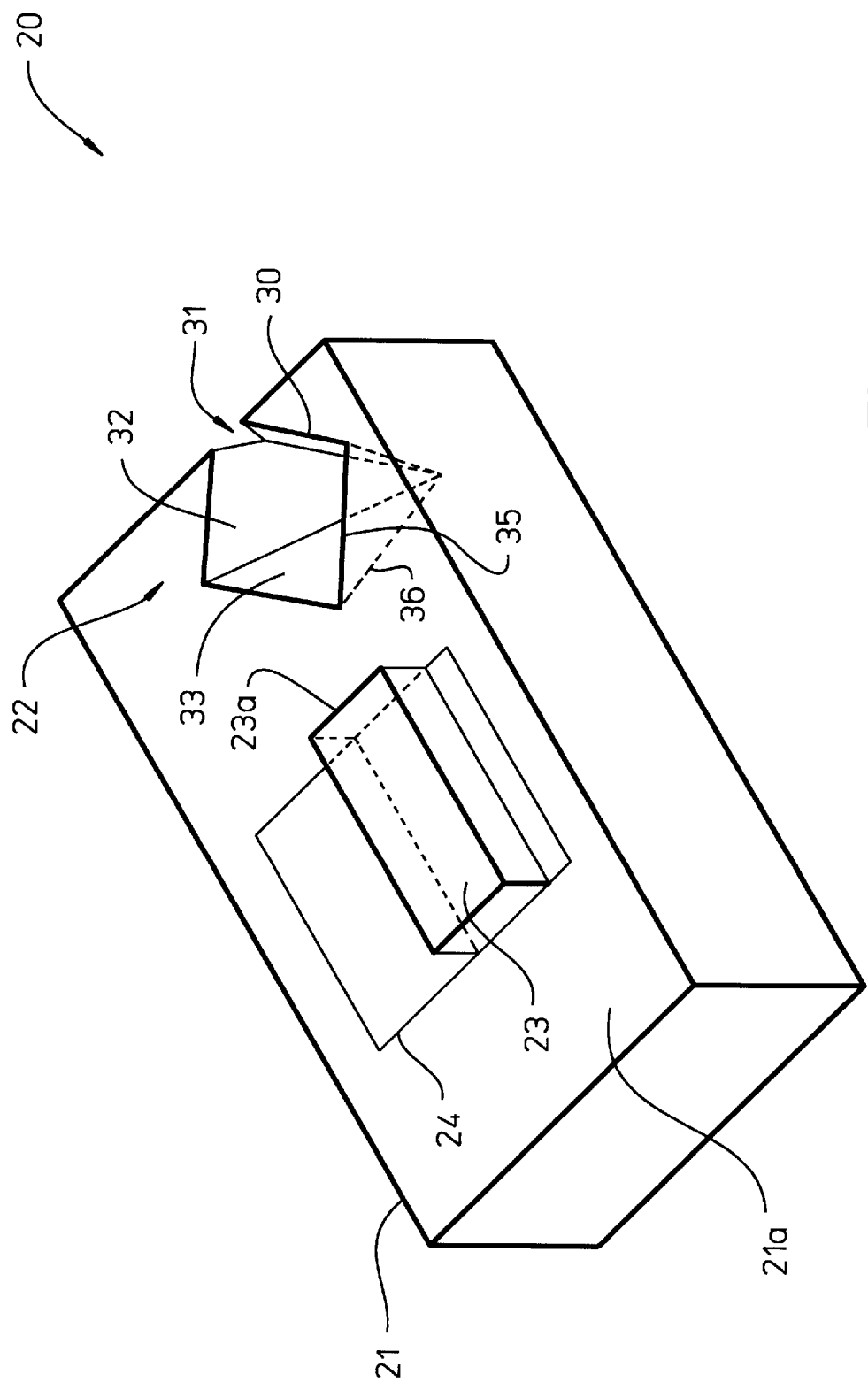
FIG. 3 is a perspective view of a mounting member having a pyramidal cavity for mounting a spherical lens with respect to a photonics device in accordance with one embodiment of the present invention.
Figure 4:
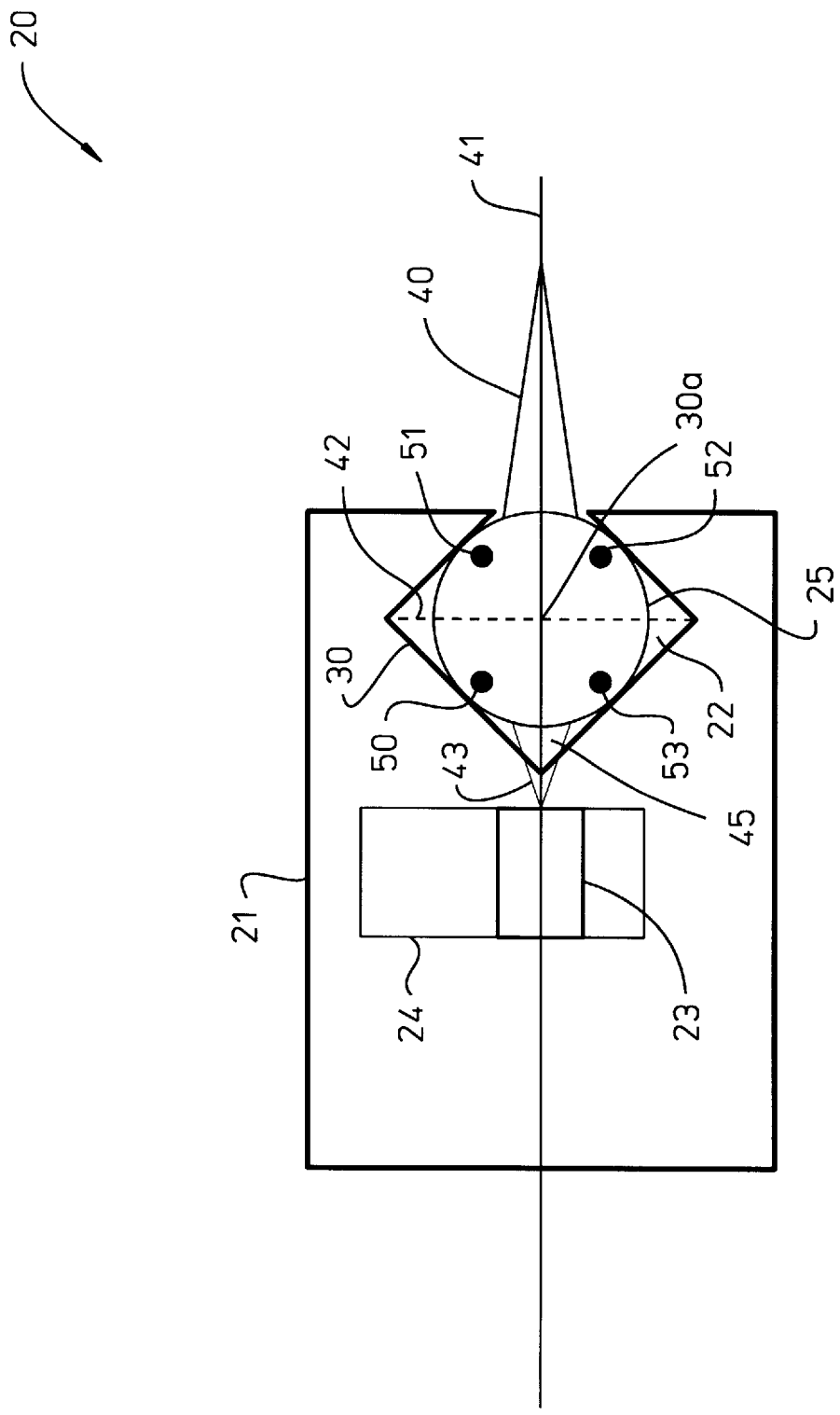
FIG. 4 is a top view of the mounting member with the photonics device and spherical lens, and the optical light path.
Figure 5:
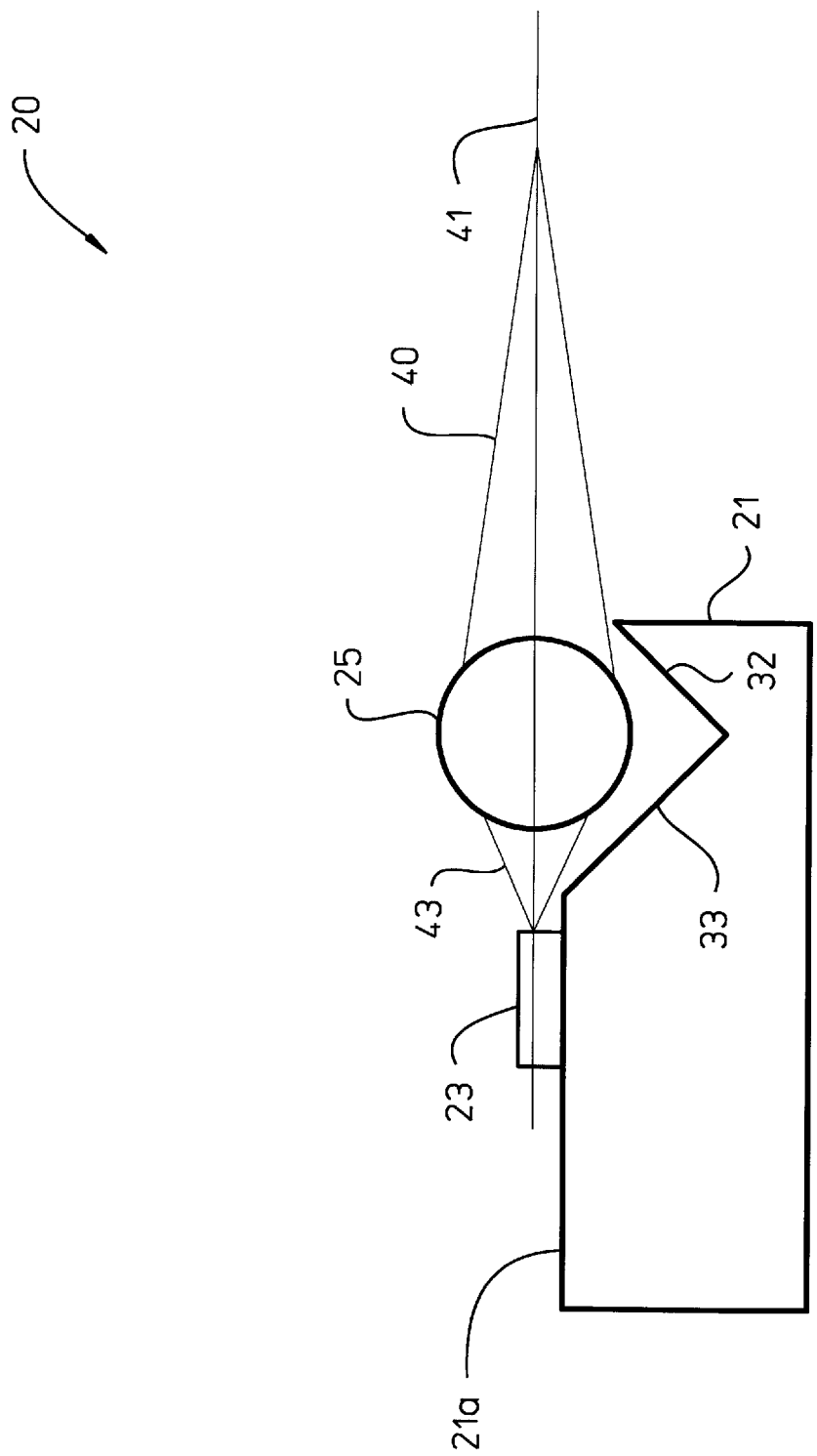
FIG. 5 is a side cross sectional view of the mounting member along the optical axis of the photonics device and the spherical lens mounted on the mounting member.

FIG. 3 is a perspective view showing a mounting member 21 of a photonics module 20 for mounting a photonics device 23 and a spherical lens 25 (shown in FIG. 4). FIG. 4 is a top view of the mounting member 21 with the photonics device 23 and the spherical lens 25 mounted. FIG. 5 is a side cross-sectional view of the mounting member 21, the photonics device 23, and the spherical lens 25 along the optical axis 41 of FIG. 4.

In accordance with one embodiment of the present invention, the photonics device 23 and the spherical lens 25 are mounted on the mounting member 21 with their optical axis close to the top surface of the mounting member 21 without light beam obstruction between the two components 23 and 25. This is achieved by (1) seating the spherical lens 25 in a precision-formed and substantially pyramidal cavity 22 (FIGS. 3–5) in the mounting member 21 and (2) mounting the photonics device 23 on the mounting member 21 such that the optical axis of the photonics device 23 is aligned with a diagonal of the pyramidal cavity 22. In addition, a notch is formed in a corner of the pyramidal cavity 22 remote from the photonics device 23 along the diagonal of the pyramidal cavity 22 to provide light beam clearance on the output side of the spherical lens 25.

The precision-formed pyramidal cavity 22 in the mounting member 21 also provides a high degree of alignment precision and optical coupling efficiency between the photonics device 23 and the spherical lens 25 at a relatively low cost. This is because the precision-formed pyramidal cavity 22 permits mounting of the spherical lens 25 with accurate placement in both axial and lateral directions with respect to the photonics device 23 without requiring active alignment. When the photonics module 20 is then optically coupled to an optical fiber (not shown) to form a communication system, only the optical fiber is actively aligned. Active alignment means aligning the components with some feedback indicating whether adjustment is needed for the alignment.

In addition, because the spherical lens 25 contacts the sloping side walls of the pyramidal cavity 22 when seated in the pyramidal cavity 22, the photonics module 20 has a robust mechanical property. Moreover, the pyramidal cavity 22 allows the spherical lens 25 to be secured in the mounting member 21 in a two-dimensional manner without requiring additional fixation for the spherical lens 25. Further, only one mounting member (i.e., the mounting member 21) is used to mount or secure both the spherical lens 25 and the photonics device 23. The mounting member 21 also allows minimized assembling time to precisely mount the spherical lens 25 because a spherically shaped lens is easily captured by a pyramidal cavity.

Referring to FIGS. 3–5, the mounting member 21 is made of silicon. The size of the mounting member 21 depends on the size of the photonics device 23 and the spherical lens 25. Because the photonics device 23 can be from 300 microns to 1 millimeter long and the spherical lens 25 can range from 300 microns to 3 millimeters, the size of the mounting member 21 can be as small as approximately 600 microns× 600 microns. In general, the smaller the size, the lower the overall cost associated.

Using silicon for the mounting member 21 allows the mounting member 21 to be subject to a photo-lithographic masking and etching process that is widely used in fabricating semiconductor integrated circuits. This allows the mounting member 21 to be processed with a great deal of accuracy. In addition, a large number of the mounting member 21 can be made from a single silicon wafer using batch processing, thus reducing the fabrication cost of the mounting member 21.

In one embodiment, the mounting member 21 is made of a silicon having opposite surfaces (e.g., a top surface 21a and a bottom surface) which are both <100> crystallographic surfaces. This type of silicon is referred to as <100> silicon below. In other embodiments, the top and bottom surfaces of the mounting member 21 do not lie on the <100> planes and intersect the <100> planes at a predetermined angle (e.g., $\alpha$). Alternatively, other crystalline semiconductor materials can be used to form the mounting member 21.

When the photo-lithographic masking process is used to define an opening 30 of the pyramidal cavity 22 on the <100> silicon mounting member 21, the shape and location of the opening 30 is precisely defined with great accuracy. Because the mounting member 21 is made of <100> silicon, the mounting member 21 can then be anisotropically etched at the opening 30 to form the pyramidal cavity 22. The speed of the anisotropic etching can be, for example, 1000 to 1 under some condition. This means that the vertical etching rate into the silicon mounting member 21 is 1000 times faster than the speed of etching towards the <111> crystallographic planes of the silicon mounting member 21. In other words, the <111> crystallographic planes serves as etch stops. The anisotropic etching causes the etched side walls (e.g., the side walls 32 and 33) of the pyramidal cavity 22 to lie on the <111> crystallographic planes of the mounting member 21. As is known, the <111> crystallographic planes intersect the <100> planes of the mounting member 21 at approximately 54.7°. Therefore, when the top and bottom surfaces of the mounting member 21 lie on the <100> planes, the side walls of the cavity 22 intersect the top and bottom surfaces of the mounting member 21 at 54.7°. When the top and bottom surfaces of the mounting member 21 intersect the <100> planes at an angle $\alpha$, then each of the side walls of the cavity 22 intersects the top and bottom surfaces of the mounting member 21 63 at an angle of 54.7°±$\alpha$.

The <111> plane side walls of the pyramidal cavity 22 precisely define the interior of the pyramidal cavity 22, causing the pyramidal cavity 22 to be precision-formed with accuracies that are within micron or even sub-micron range. When the spherical lens 25 is seated in the pyramidal cavity 22, the three dimensional position of the spherical lens 25 is then defined with the same accuracy as that of the pyramidal cavity 22 which is based on standard photo-lithographic processes.

In one embodiment, the anisotropic etching is performed using a potassium hydroxide (KOH) etchant. Alternatively, other types of etchants can be used for etching the pyramidal cavity.

The opening 30 of the pyramidal cavity 22 is substantially square. An opening edge (e.g., opening edge 35) is formed at the intersection of a side wall and the top surface 21a of the mounting member 21. In addition, a side wall edge (e.g., side wall edge 36) is also formed at the intersection of two adjacent side walls.

In one embodiment, the size of the opening 30 of the pyramidal cavity 22 is desirably larger than that of the spherical lens 25 such that the spherical lens 25 contacts the side walls, not the opening edges, of the pyramidal cavity 22 when seated in the pyramidal cavity 22, as shown in FIG. 4. In this case, the sloping side walls of the pyramidal cavity 22 provide robust contact points (i.e., the contact points 50–53) for the spherical lens 25. As is known, a plane is more robust than an edge. An edge is fragile and difficult to form. If an edge is not properly formed or is chipped away, the contact points with the spherical lens may move. This may cause the location of the spherical lens to be shifted from the predefined location. In addition, the edge contact points typically can not confine a spherically shaped object. These problems disappear when planes are used to provide the contact points. In addition, the sloping side walls of the pyramidal cavity 22 precisely define the location of the spherical lens 25 at the contact points. Alternatively, the size of the pyramidal cavity 22 is such that the spherical lens 25 contacts the opening edges of the pyramidal cavity 22 when seated in the pyramidal cavity 22.

After the pyramidal cavity 22 is formed on the mounting member 21, the photonics device 23 is then mounting on the mounting member 21. The photonics device 23 is mounted on a metal pad 24 that is deposited on the top surface 21a of the mounting member 21. By directly mounting the photonics device 23 on the mounting member 21 via the metal pad 24, the optical axis 41 of the photonics device 23 is close to the top surface 21a of the mounting member 21. This causes the optical axis 41 of the photonics device 23 to have a relatively low height from the top surface 21a.

In one embodiment, the optical axis 41 is approximately 90 microns from the top surface 21a of the mounting member 21. Alternatively, the optical axis 41 can be higher or lower than 90 microns from the top surface 21a of the mounting member 21. The metal pad 24 is formed on a predetermined area of the top surface 21a of the mounting member 21 employing the photo-lithographic process (i.e., masking and metal deposition through the mask). This forms the metal pad 24 in a predetermined location on the top surface 21a of the mounting member 21. The metal pad 24 provides an electrical contact for the photonics device 23.

The height of the optical axis 41 affects the beam clearance between the photonics device 23 and the spherical lens 25. When the height of the optical axis 41 is relatively low, there may not be a beam clearance between the two components 23 and 25. Of course one can try to solve this problem by raising the height of the optical axis 41. This, however, creates many other problems.

In order to provide a beam clearance between the photonics device 23 and the spherical lens 25 when the optical axis 41 of the photonics device 23 has a relatively low height, the photonics device 23 is placed on the mounting member 21 such that a front facet 23a of the photonics device 23 faces a corner (i.e., the corner 45) of the pyramidal cavity 22, as shown in FIG. 4. One diagonal of the opening 30 of the pyramidal cavity 22 is aligned or collinear with the optical axis 41 of the photonics device 23 while the other diagonal 42 of the opening 30 is substantially perpendicular to the optical axis 41 (see FIG. 4). This causes the light beam path 43 between the photonics device 23 and the spherical lens 25 to extend into the pyramidal cavity 22 below the top surface 21a of the mounting member 21 without any beam obstruction by the mounting member 21. In other words, a light beam channel is created at the corner 45 for the light beam path 43 (see FIGS. 4 and 5). This allows light beam to reach the spherical lens 25 from the photonics device 23 (or vice versa) without any beam obstruction, thus achieving a high optical coupling efficiency.

Figure 11A:
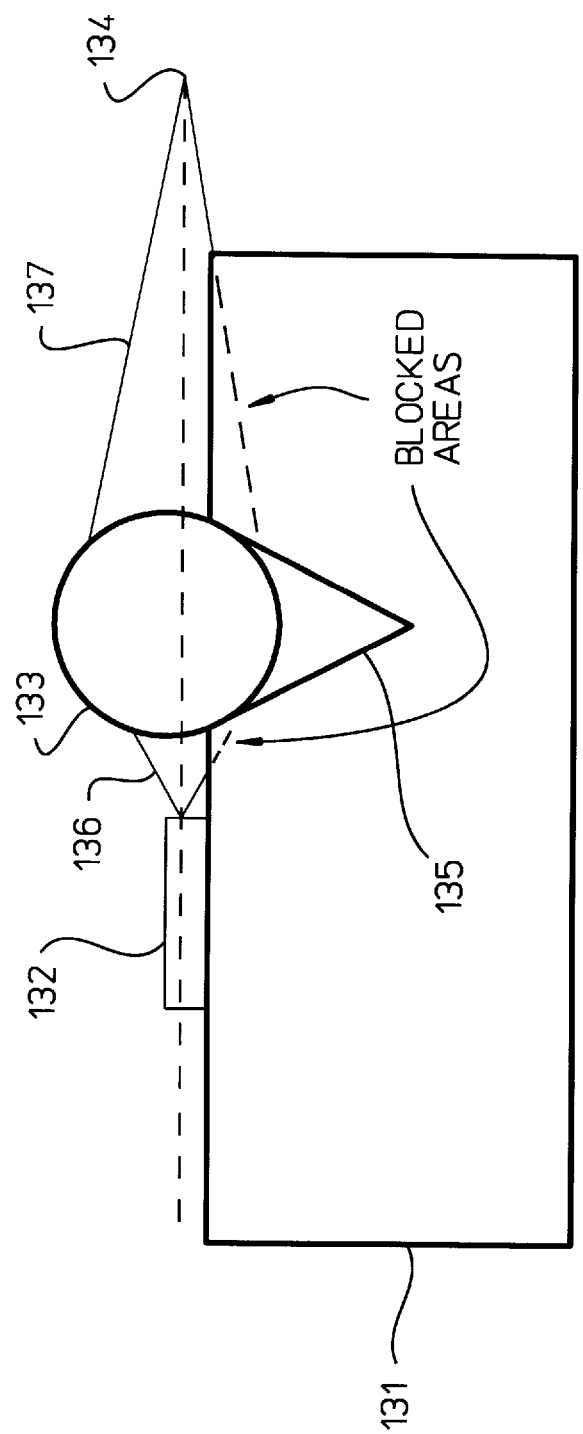
FIGS. 11A and 11B show the light beam obstruction of another arrangement for mounting the photonics device.
Figure 11B:
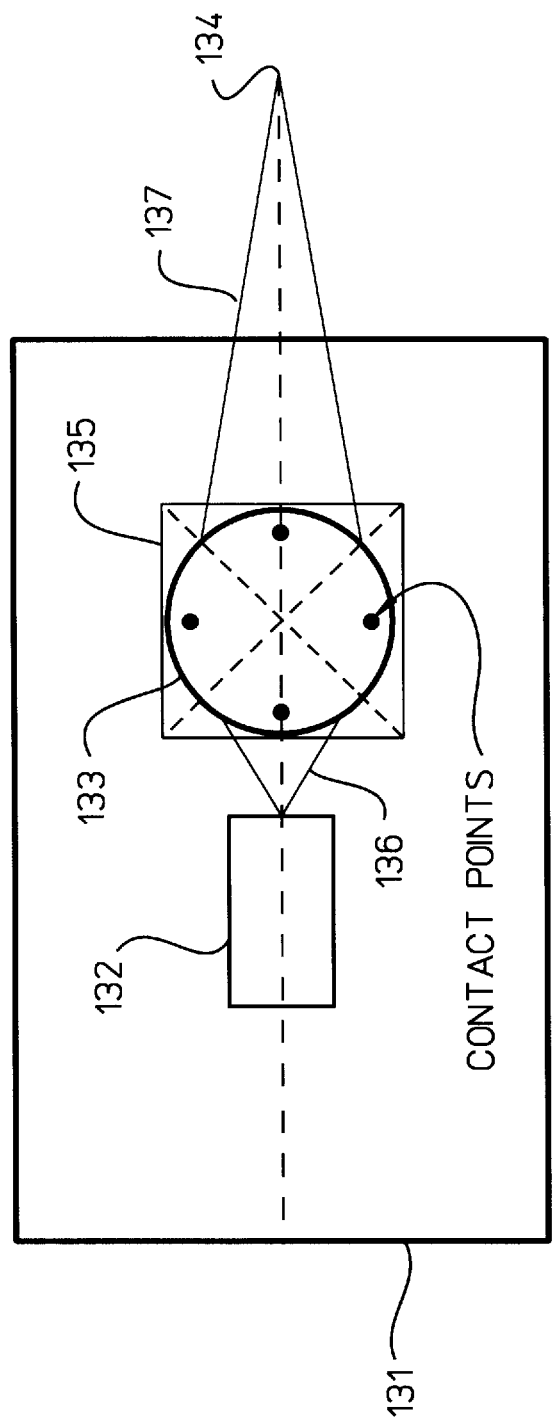

It is, however, to be noted that no light beam channel is created and beam obstruction may occur if the opening 30 has a side, instead of a corner, facing the front facet 23a of the photonics device 23. FIGS. 11A and 11B show such a case. As can be seen from FIGS. 11A and 11B, a pyramidal cavity 135 in a mounting member 131 has a side facing a photonics device 132 also mounted on the mounting member 131. Because of the divergence of the optical beam, the light beam path 136 between a spherical lens 133 and the photonics device 132 goes below the top surface of the mounting member 131, partially obstructing the light beam. Because silicon substrate is opaque to light, the mounting member 131 obstructs the light that travels into the mounting member 131. Likewise, the other side of the spherical lens 133 when seated in the pyramidal cavity 135 also experience the same light beam obstruction, as shown in FIGS. 11A and 11B.

However and as can be seen from FIGS. 3–5, by placing the photonics device 23 such that its optical axis 41 is aligned with a diagonal of the pyramidal cavity 22, a light beam channel is created between the photonics device 23 and the spherical lens 25 even when the optical axis 41 has a relatively low height from the top surface 21a of the mounting member 21. As can be seen from FIGS. 3–5, although the light beam path 43 goes below the top surface 21a of the mounting member 21, it does not hit the mounting member 21 because it travels through the open space provided by the pyramidal cavity 22.

Figure 12:
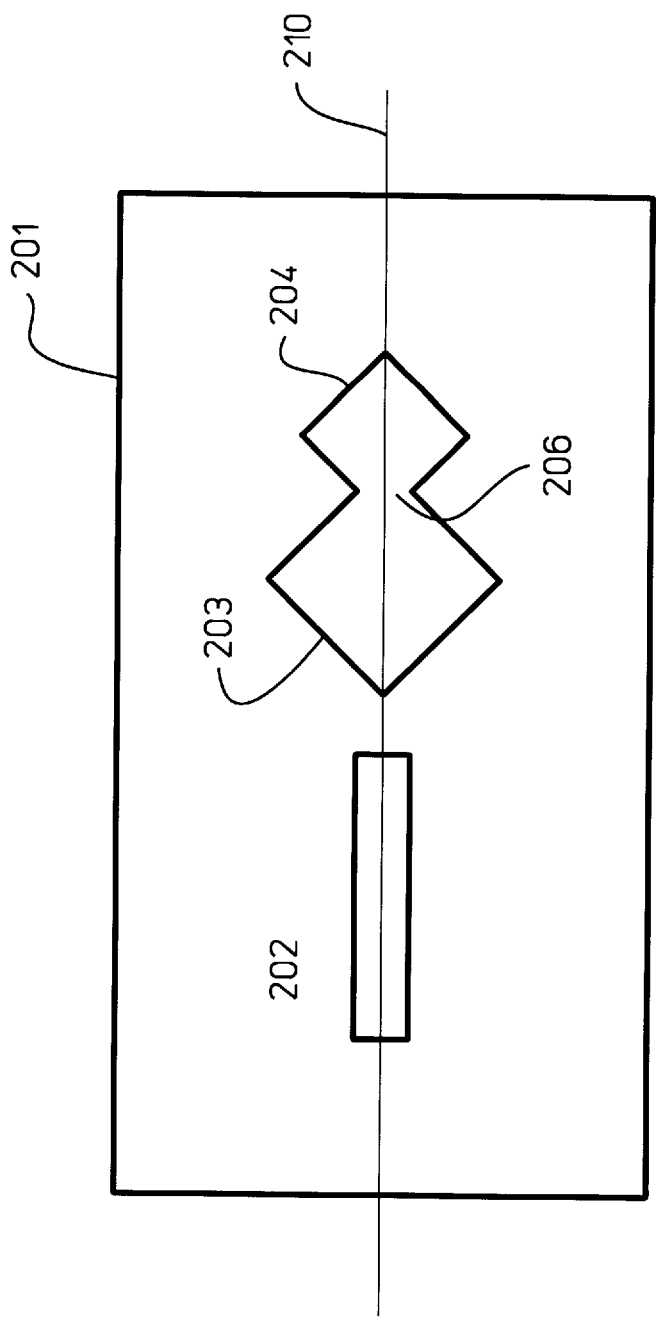
FIGS. 12 through 14 show another embodiment of providing beam clearance at the output side of the spherical lens when seated in the pyramidal cavity.
Figure 13:
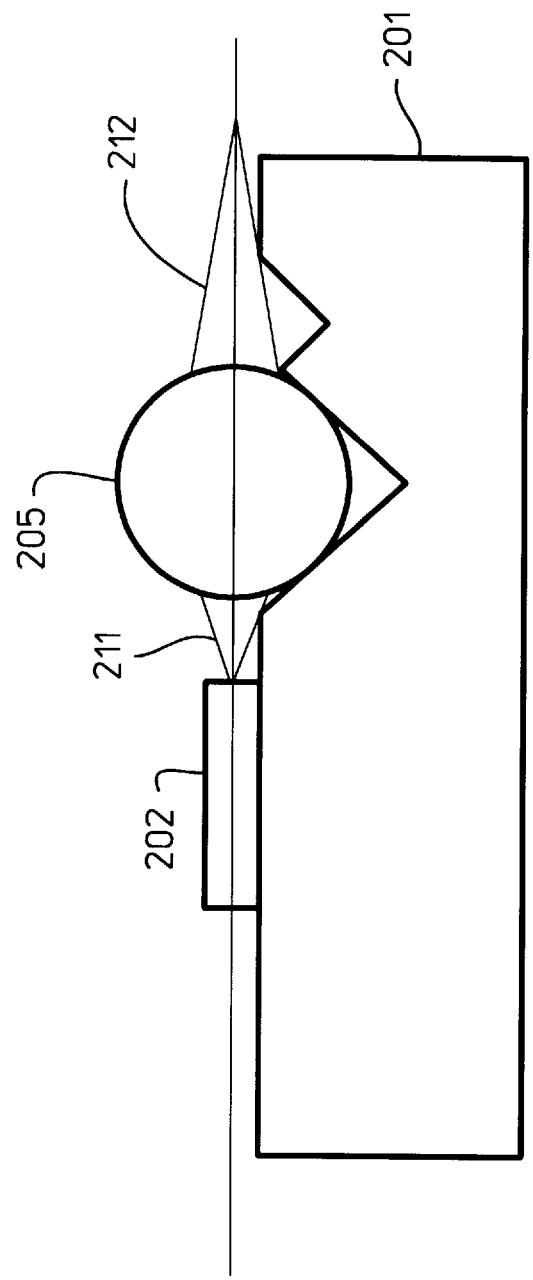
Figure 14:
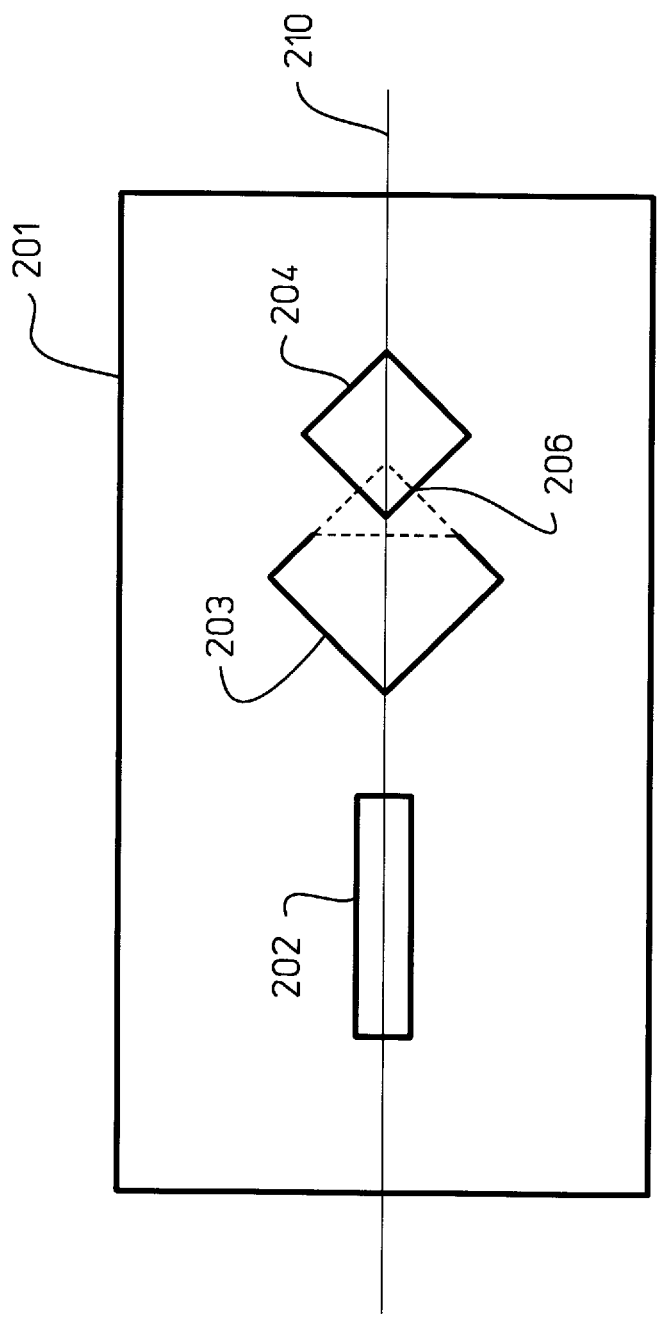

In order to provide the beam clearance at the other side of the pyramidal cavity 22 for the spherical lens 25, a V-shaped notch 31 is formed at the corner opposite the corner 45 of the pyramidal cavity 22 (see FIGS. 3 and 4). The notch 31 is formed when the mounting member 21 is separated from the wafer along that corner. In the case that the mounting member 21 is made in a silicon wafer, the wafer can be sawn or scribed such that the corner is removed and the notch is formed. The purpose of forming the V-shaped notch 31 is to create a clear and unobstructed light beam path 40 along the optical axis 41, as shown in FIGS. 4 and 5. Alternatively, other mechanisms can be used to provide the beam clearance. For example, another cavity can be formed adjacent to the pyramidal cavity 22 such that the two cavities overlap each other to form the V-shaped notch, as shown in FIGS. 12 through 14. FIG. 12 is a top view and FIG. 13 is a cross-sectional side view. FIG. 14 shows one embodiment in which a photo-lithographic pattern is etched in KOH etchant to form a cavity that overlaps another to result in a notch 31.

As can be seen from FIGS. 12–14, the pyramidal cavity 204 overlaps the pyramidal cavity 203 to form the notch 206. The shape of the cavity 204 is substantially identical to that of the cavity 203. Overlapping pyramidal cavities are created from separate "triangle-like" photo-lithographic starting patterns. As the KOH etching progresses, the starting patterns are undercut and begin to overlap, the degree of overlap can be controlled by the shape of the starting pattern and the length of the etching. In one embodiment, the size of the cavity 204 is slightly smaller than that of the cavity 203. Alternatively, the size of the cavity 204 can be larger or smaller than that of the cavity 203.

As can be seen from FIG. 13, the notch 206 provides the beam clearance for the beam path 212. As can be seen from FIG. 14, the cavity 204 is first formed through anisotropic etching in the mounting member 201 and the cavity 203 is then anisotropically etched towards the cavity 204, causing the two cavities 203–204 to overlap, thus forming the notch 206. Alternatively, the notch 206 can be formed by first forming the cavity 203. The cavity 204 is then formed to overlap the cavity 203

The photonics device 23 is positioned at a predetermined distance from the pyramidal cavity 22 such that center 30a of the opening 30 is at the focal point of the photonics device 23. In other words, the distance between the front facet 23a of the photonics device 23 and the pyramidal cavity 22 is set such that the spherical lens 25 can optically couple the light to or from the photonics device 23. The four edges of the opening 30 are neither parallel nor perpendicular to the front facet 23a of the photonics device 23. Instead, each of them is at an approximately 45° angle with the front facet 23a of the photonics device 23. Alternatively, the angle can be greater or less than 45°.

In one embodiment, the predetermined distance is such that the closest surface of the spherical lens 25 to the front facet 23a of the photonics device 23 is within sixty microns from the front facet 23a of the photonics device 23. This distance applies to many applications, particularly where the light is to be collimated. In another embodiment, the distance can be within ten microns. Alternatively, the distance can be shorter or longer.

In one embodiment, the photonics device 23 is a semiconductor laser. In a further embodiment, the photonics device 23 is an edge emitting semiconductor laser. In another embodiment, the photonics device 23 is a photo detector. In this case, the photo detector can be a surface detecting photo detector or an edge detecting photo detector.

In one embodiment, the metal pad 24 is a gold or aluminum layer. In alternative embodiments, other electrically conductive materials can be used to form the metal pad 24.

The photonics device 23 is fixed on the metal pad 24 by known means. For example, the photonics device 23 can be bonded to the metal pad 24 via solder bonding. Alternatively, a conductive epoxy can be used to bond the photonics device 23 onto the metal pad 24. Moreover, the photonics device 23 can be first solder bonded onto the metal pad 24. Then the air gaps between the photonics device 23 and the metal pad 24 can be filled by the conductive epoxy. A known textured cold welding technique can also be used to bond the photonics device 23 to the metal pad 24.

The spherical lens 25 is bonded in the pyramidal cavity 22 after being seated in the pyramidal cavity 22. In one embodiment, glue is used to bond the spherical lens 25 in the pyramidal cavity 22. Alternatively, other type of adhesive material can be used to bond the spherical lens 25 in the cavity 22. For example, epoxy may be used.

In one embodiment, the refractive index of the spherical lens 25 is approximately 1.5. In other embodiments, the refractive index of the spherical lens 25 can be higher than 1.5. For example, the refractive index of the spherical lens 25 can be 2.0.

Figure 6:
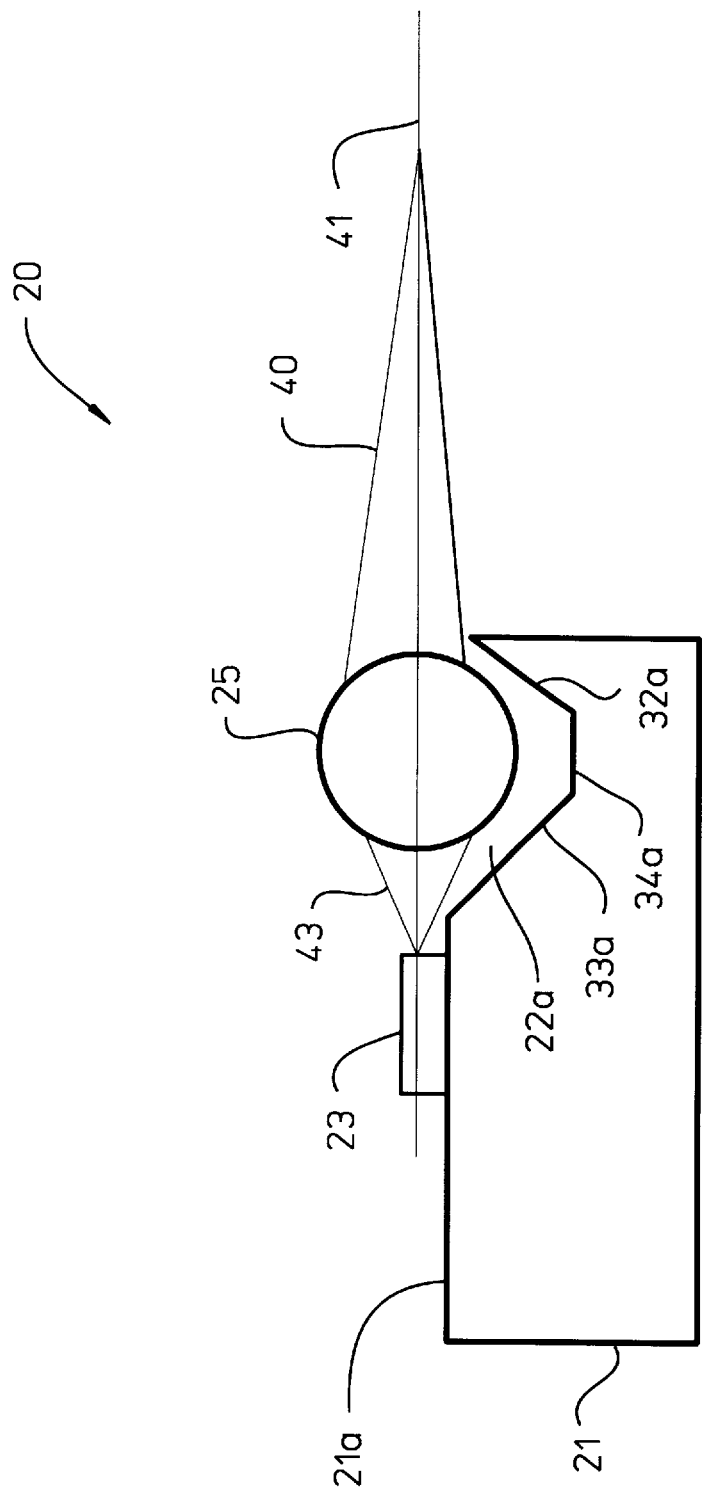
FIG. 6 shows that the pyramidal cavity of FIGS. 3–5 has a truncated bottom.

In one embodiment, the pyramidal cavity 22 is substantially a quadrilateral pyramid (shown in FIGS. 3 and 4). Alternatively, the pyramidal cavity 22 can be in other shapes. For example, the pyramidal cavity 22 can be a truncated quadrilateral pyramid (as shown in FIG. 6). FIG. 6 shows the mounting member 21 with a truncated pyramidal cavity 22a. As can be seen from FIG. 6, a flat bottom surface 32a connects all the side walls (e.g., the side walls 32a and 33a) of the pyramidal cavity 22. The bottom surface 32a is not in contact with the spherical lens 25 when the spherical lens 25 is seated in the cavity 22a. In this case, the side walls of the pyramidal cavity 22 are not triangular side walls. Instead, these side walls are in trapezoid shape and are connected by the flat bottom surface 32a.

In addition, the opening 30 of the pyramidal cavity 22 shown in FIGS. 3–5 may be in other shapes. For example, the opening 30 can be a square opening with one or more corners of the pyramidal cavity 22 truncated.

Figure 15:
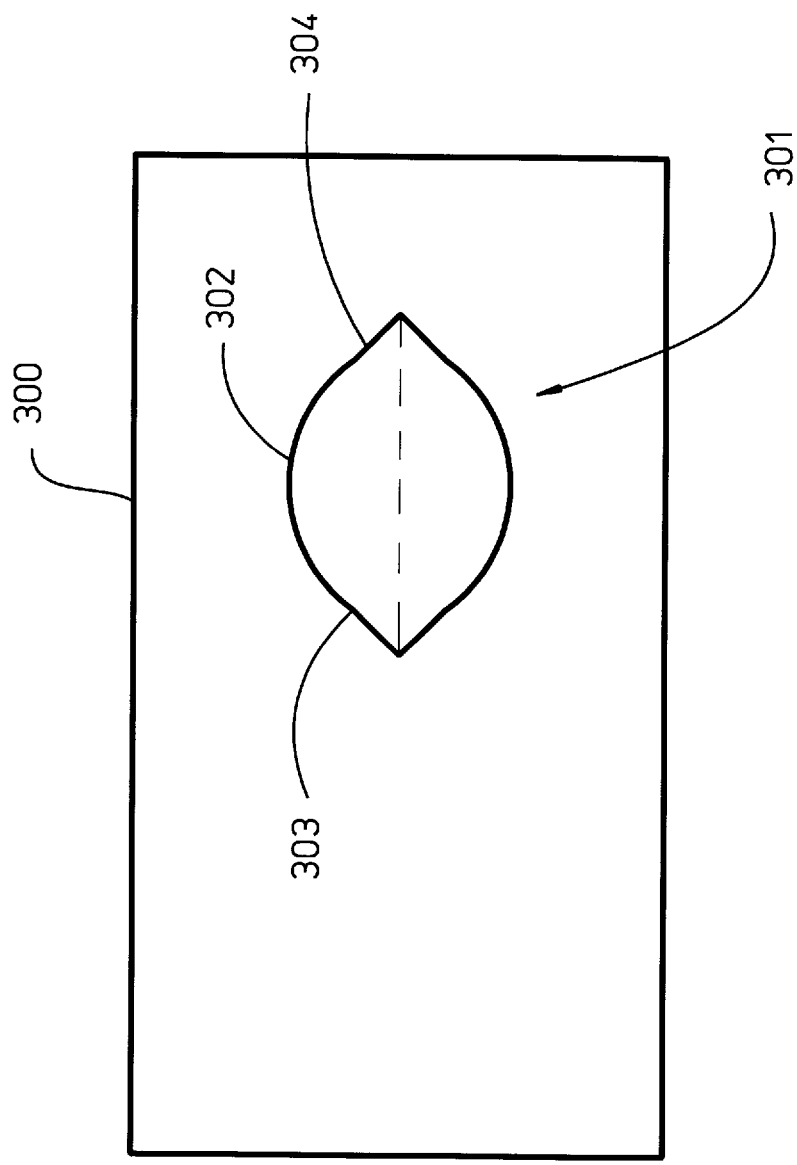
FIG. 15 shows another shape of the cavity of FIGS. 3–4.

Moreover, the shape of the cavity 22 may not need to be pyramidal. The cavity 22, for example, can be conical with circular or elliptical opening coupled to a couple of diagonal sloping grooves for providing beam clearance, as shown in FIG. 15. FIG. 15 is a top view of a mounting member 300 that includes a conical cavity 301 having a circular opening 302 and a pair of diagonal sloping grooves 303 and 304 that are coupled to the circular opening 302.

Figure 7:
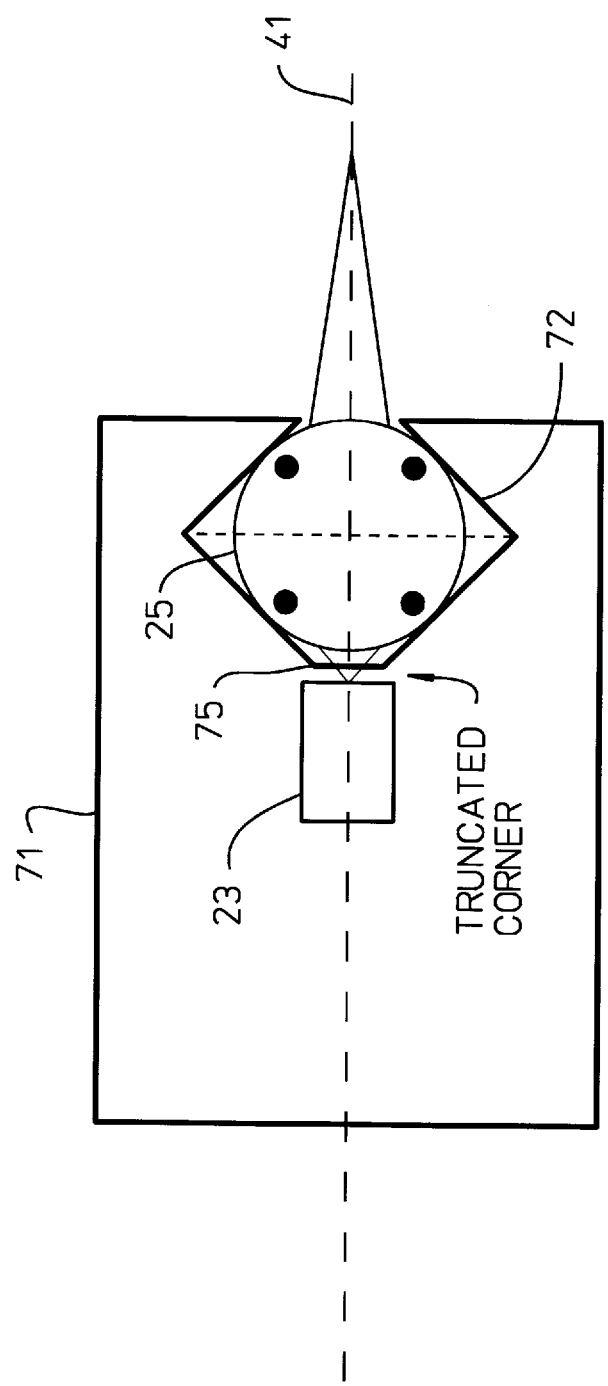
FIG. 7 is a top view showing another configuration of the pyramidal cavity of FIGS. 3–6.
Figure 8:
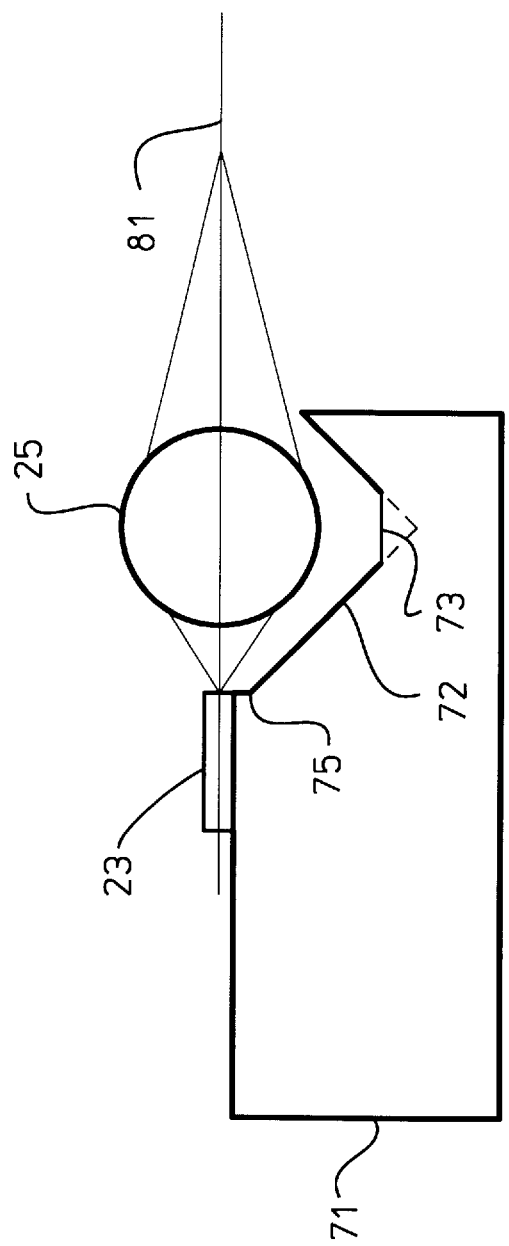
FIG. 8 is a side cross sectional view of the mounting member along a line 81 of FIG. 7.

FIGS. 7 and 8 show another type of pyramidal cavity 72 formed on a mounting member 71 for mounting the photonics device 23 and the spherical lens 25 in accordance with another embodiment of the present invention. FIG. 7 is a top view of the mounting member 71 and FIG. 8 is a side cross sectional view along an optical axis 81 of the photonics device 23. As can be seen from FIGS. 4–5 and 7–8, the pyramidal cavity 72 is identical to the pyramidal cavity 22, except that the pyramidal cavity 72 has a truncated corner 75 and a flat bottom 73. This shape is advantageous when the focal distance is shorter than the lens to corner distance. Alternatively, the pyramidal cavity 72 can just have the truncated corner 75. The truncated corner 75 allows the photonics device 23 to be able to be placed closer to the spherical lens 25 than the pyramidal cavity 22 does. The different distances between the photonics device 23 and the spherical lens 25 provided by the pyramidal cavities 22 and 72 are to accommodate different design objectives using different refractive indices and sizes that the spherical lens 25 may have.

It is to be noted that not all of the components of the photonics module 20 are shown in FIGS. 3–8. This is to allow parts of the photonics module 20 to be shown more clearly. For example, FIG. 3 does not show the spherical lens 25 optically coupled to an optical fiber.

Figure 9:
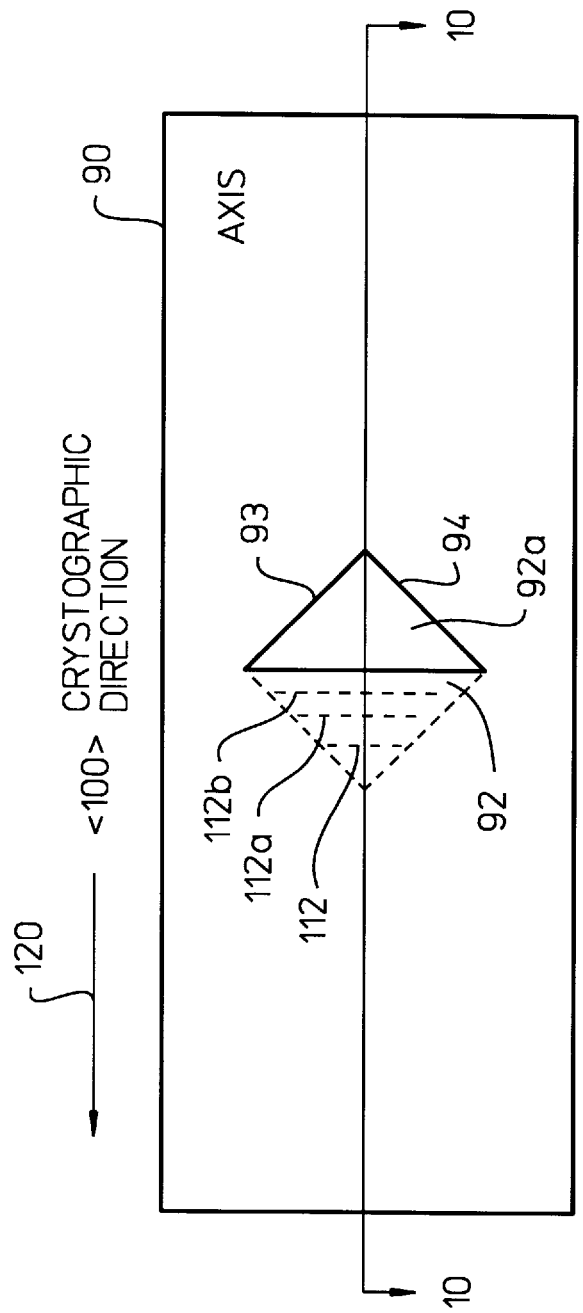
FIGS. 9 and 10 show the process of making the pyramidal cavity on the mounting member in accordance with one embodiment of the present invention.
Figure 10:
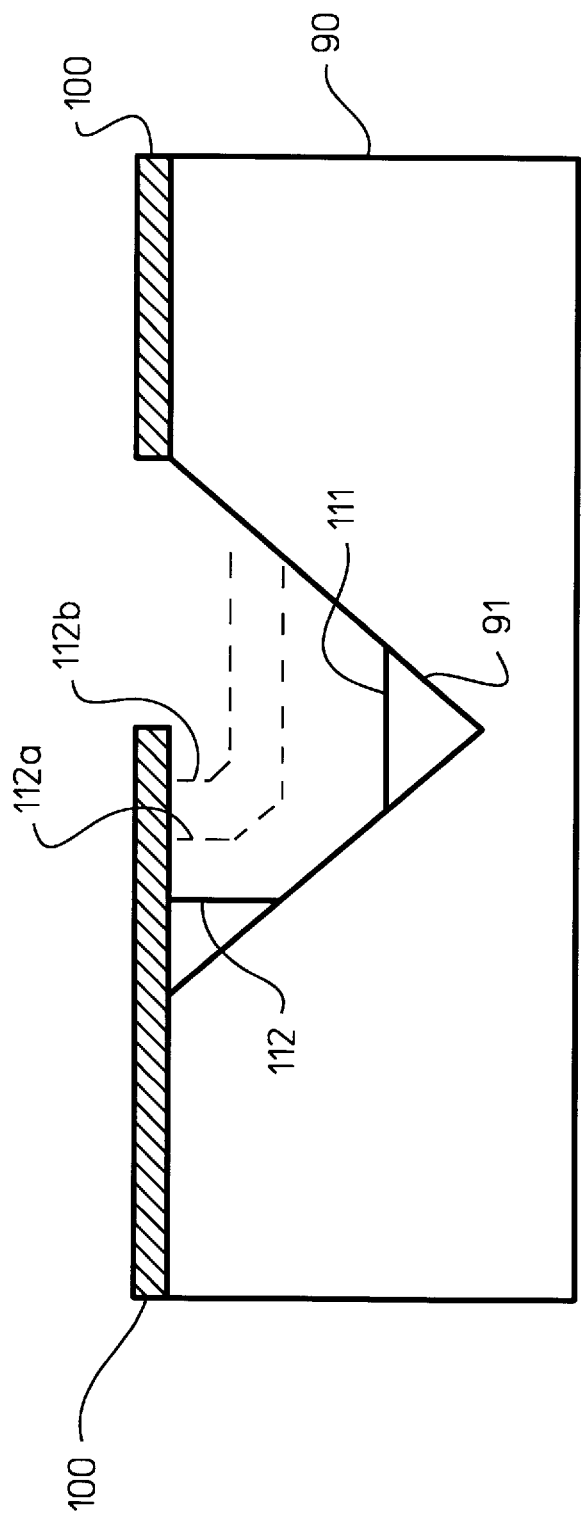

FIGS. 9 and 10 illustrate the process of etching a <100> crystalline substrate 90 to form a pyramidal cavity 91 in accordance with one embodiment of the present invention. FIG. 9 is a top view of the semiconductor substrate 90 and FIG. 10 is a side cross sectional view along line 10—10 of FIG. 9. As can be seen from FIGS. 9 and 10, the <100> top surface of the semiconductor substrate 90 is exposed by a substantially triangular opening 92a in a photo-resistive layer 100 (shown in FIG. 10) for etching the pyramidal cavity 91. The triangular opening 92a is photo-lithographically formed on the photoresistive layer 100 along the <100> crystallographic axis 120 of the substrate 90. The two edges 93 and 94 of the triangular opening 92a lie on two <111> crystallographic planes of the substrate 90. Alternatively, the substantially triangular opening 92a may look like a square with a truncated corner.

The substrate 90 is then anisotropically etched through the opening 92a using, for example, the KOH etchant. The speed of the anisotropic etching can be, for example, 1000 to 1 to result in a vertical wall (e.g., the walls 112–112b in FIG. 10) extending horizontally beneath the photoresistive layer 100, parallel to the hypotenuse of the triangular opening 92a. The etching rate of pushing the vertical wall is approximately the same as the vertical etching rate. The etching is eventually self stopped in the cavity 91 when the vertical wall 112 disappears. At this time, the pyramidal cavity 91 has a square opening 92 with all of its four side walls defined by the <111> crystallographic planes. When the anisotropic etching is stopped at an earlier stage of the etching process, the pyramidal cavity 91 is formed to have a truncated corner formed by the vertical wall 112 (shown in FIG. 10). In addition, the pyramidal cavity 91 can be etched to have a flat bottom surface 111. FIG. 10 shows different stages of the anisotropic etching.

As can be seen from FIGS. 9 and 10, depending on the etching conditions, the pyramidal cavity 91 can have the shape of the pyramidal cavity 22 of FIGS. 3–5, the shape of the pyramidal cavity 22a of FIG. 6, or the shape of the pyramidal cavity 72 of FIGS. 7 and 8. The pyramidal cavity 91 assumes the shape of the pyramidal cavity 22 of FIGS. 3–5 when the pyramidal cavity 91 is fully etched. When the etching stops before the pyramidal cavity 91 is fully etched, the pyramidal cavity 91 may assume the shape of the pyramidal cavity 72 of FIGS. 7 and 8.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. An optical device, comprising:
   (A) a substrate;
   (B) a precision-formed cavity with sloping side walls in the substrate, wherein the cavity is a substantially pyramidal cavity,
   (C) a photonics device mounted on the substrate at a predefined distance from the cavity with its optical axis aligned with a diagonal of the cavity;
   (D) a spherical lens confined by the side walls of the cavity in a predefined relationship with the photonics device without light beam obstruction.

2. The optical device of claim 1, wherein the substrate is made of crystalline silicon material and the pyramidal cavity is formed by masking and anisotropic etching a predefined area so as to have the side walls of the pyramidal cavity predominantly along the crystallographic planes of the substrate.

3. The optical device of claim 2, wherein the substrate has <100> surfaces and the side walls of the[]pyramidal cavity are <111> crystallographic planes.

4. A. The optical device of claim 1, wherein the photonics device is one of a semiconductor laser and a semiconductor photo detector.

5. The optical device of claim 1, further comprising a second photo-lithographically formed pyramidal cavity that overlaps the pyramidal cavity to form a notch.

6. The optical device of claim 1, wherein the pyramidal cavity further comprises a V-shaped notch in a corner of the pyramidal cavity remote from the photonics device along the diagonal.

7. The optical device of claim 1, wherein the pyramidal cavity further comprises a truncated corner adjacent the photonics device along the diagonal.

8. The optical device of claim 1, wherein the spherical lens is bonded to the substrate in the cavity.

9. An optical device, comprising:
   (A) a substrate;
   (B) a precision-formed cavity with sloping side walls in the substrate, wherein the cavity is one of a quadrilateral pyramid cavity and a conical cavity with a pair of sloping grooves for light beam clearance;
   (C) a photonics device mounted on the substrate at a predefined distance from the cavity with its optical axis aligned with a diagonal of the cavity;
   (D) a spherical lens confined by the side walls of the cavity in a predefined relationship with the photonics device without light beam obstruction.

10. The optical device of claim 9, wherein the substrate is made of crystalline silicon material and has top and bottom surfaces that intersect <100> crystallographic planes of the substrate at a predetermined angle, wherein the side walls of the cavity lie on <111> crystallographic planes of the substrate.

11. A method of making an optical device, comprising:
   (A) precision-forming a cavity with sloping side walls in a substrate, wherein the substrate is made of crystalline silicon material and the step (A) is photo-lithographically performed;
   (B) mounting a photonics device on the substrate at a predefined distance from the cavity with an optical axis of the photonics device aligned with a diagonal of the cavity;
   (C) seating a spherical lens in the cavity, the spherical lens being in contact with the side walls of the cavity to have a predefined relationship with the photonics device without light beam obstruction.

12. The method of claim 11, wherein the cavity is formed by masking and anisotropic etching the substrate so as to have the side walls of the cavity defined by crystallographic planes of the substrate.

13. The method of claim 12, wherein the substrate has <100> surfaces and the side walls of the pyramidal cavity are <111> crystallographic planes.

14. The method of claim 11, wherein the step (A) further comprises the steps of
   (a) exposing a pattern on the substrate, the pattern defining substantially half of the square opening of the cavity;
   (b) etching through the exposed pattern, the etching being anisotropic and predominantly along the crystallographic planes of the substrate such that the cavity is formed.

15. The method of claim 14, further comprising the step of forming a truncated corner of the cavity by stopping etching before the square opening is formed such that the photonics device can be at a minimized distance from the spherical lens.

16. The method of claim 11, wherein the step (B) further comprises the step of forming a V-shaped notch in a corner of the cavity remote from the photonics device along the diagonal.

17. The method of claim 11, further comprising the step of precision-forming a second cavity that overlaps the cavity to form a notch.

18. The method of claim 11, wherein the cavity is one of a substantially quadrilateral pyramid and a conical cavity with a pair of sloping grooves for light beam clearance.

19. The method of claim 11, wherein the substrate is made of crystalline silicon material and has top and bottom surfaces that intersect <100> crystallographic planes of the substrate at a predetermined angle, wherein the side walls of the cavity lie on <111> crystallographic planes of the substrate.

20. The method of claim 11, further comprising the step of bonding the seated spherical lens to the substrate in the cavity.

* * * * *